United States Patent [19]
Crotty, III

[11] Patent Number: 6,033,005
[45] Date of Patent: Mar. 7, 2000

[54] MOLDED POLYMER SUN VISOR WITH FUSED UPHOLSTERY COVER

[75] Inventor: Willard E. Crotty, III, Quincy, Mich.

[73] Assignee: Crotty Corporation, Quincy, Mich.

[21] Appl. No.: 09/168,045

[22] Filed: Oct. 7, 1998

[51] Int. Cl.[7] .................................................. B60J 3/00
[52] U.S. Cl. ....................................... 296/97.1; 296/97.5
[58] Field of Search ................................... 296/97.1, 97.5

[56] References Cited

U.S. PATENT DOCUMENTS

| | | | |
|---|---|---|---|
| 5,336,460 | 8/1994 | Hettinga | 264/251 |
| 5,580,118 | 12/1996 | Crotty, III | 296/97.12 |
| 5,762,852 | 6/1998 | Hettinga | 264/251 |

OTHER PUBLICATIONS

Andover Industries, www.ai–bmpi.com; BASF Aktiengesellschaft, www.basf–ag.basf.de; Foam Fabricators, www.ffab.com; and Montell, www.montell.com.

Primary Examiner—Gary C. Hoge
Attorney, Agent, or Firm—Baker & Daniels

[57] ABSTRACT

A sun visor assembly which is formed from an expanded polypropylene (EPP) shell having an upholstery cover fused to the exterior surface thereof. The polymer shell is further comprised of two shell halves which are joined together with a molded polymer band. The upholstery cover is fused to the exterior surface of the shell in the area of the polymer band so that the polymer band and the upholstery cover combine to form a hinge about which the shell halves are foldable together to form the completed sun visor. The shell halves are secured together by corresponding protrusions and slots formed in the two shell halves, respectively. The protrusions are fused into the slots. A vanity mirror assembly can be thermally fused to one of the shell halves or, alternatively, can be used to secure the two shell halves together.

19 Claims, 3 Drawing Sheets

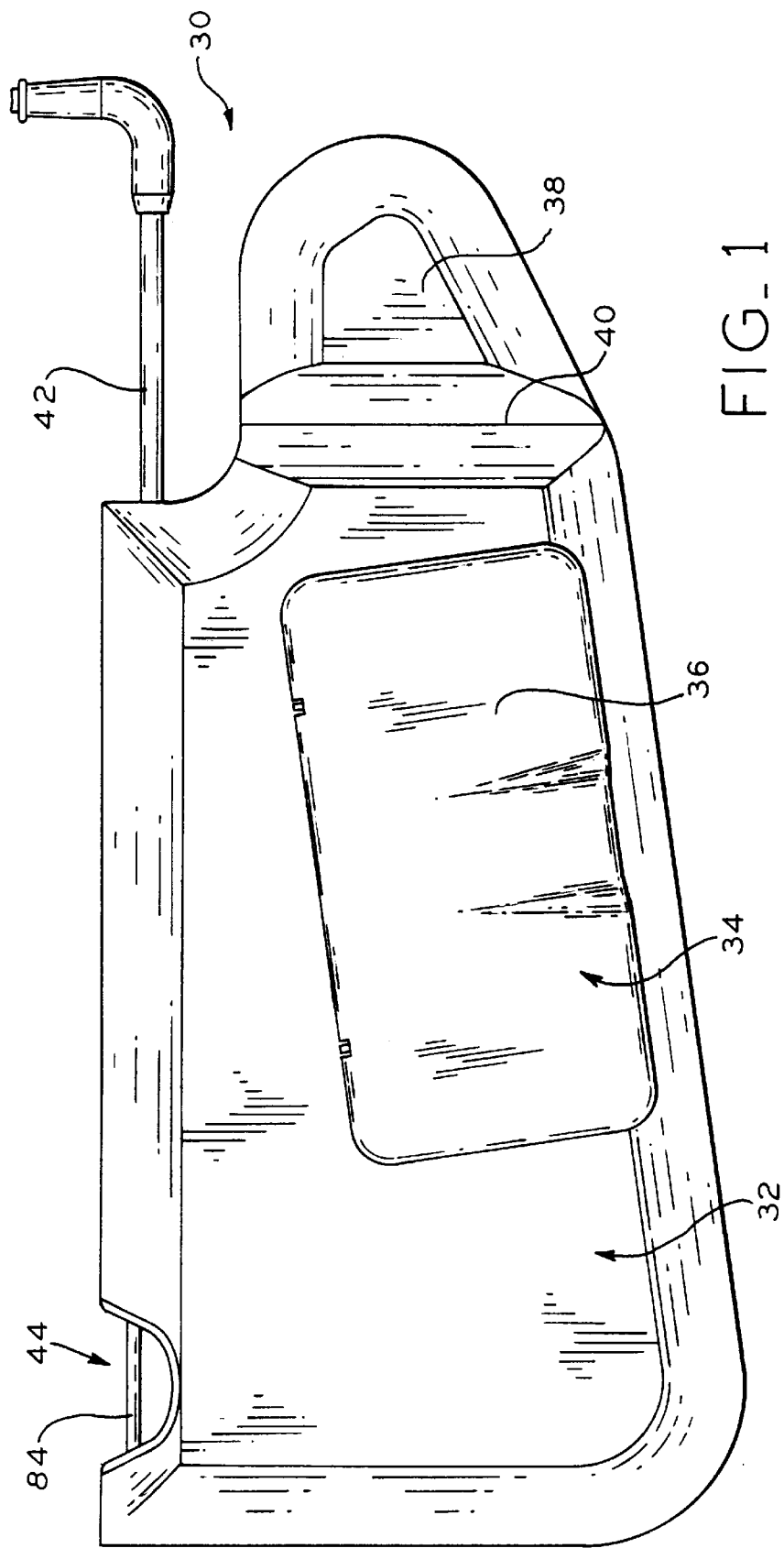
FIG_1

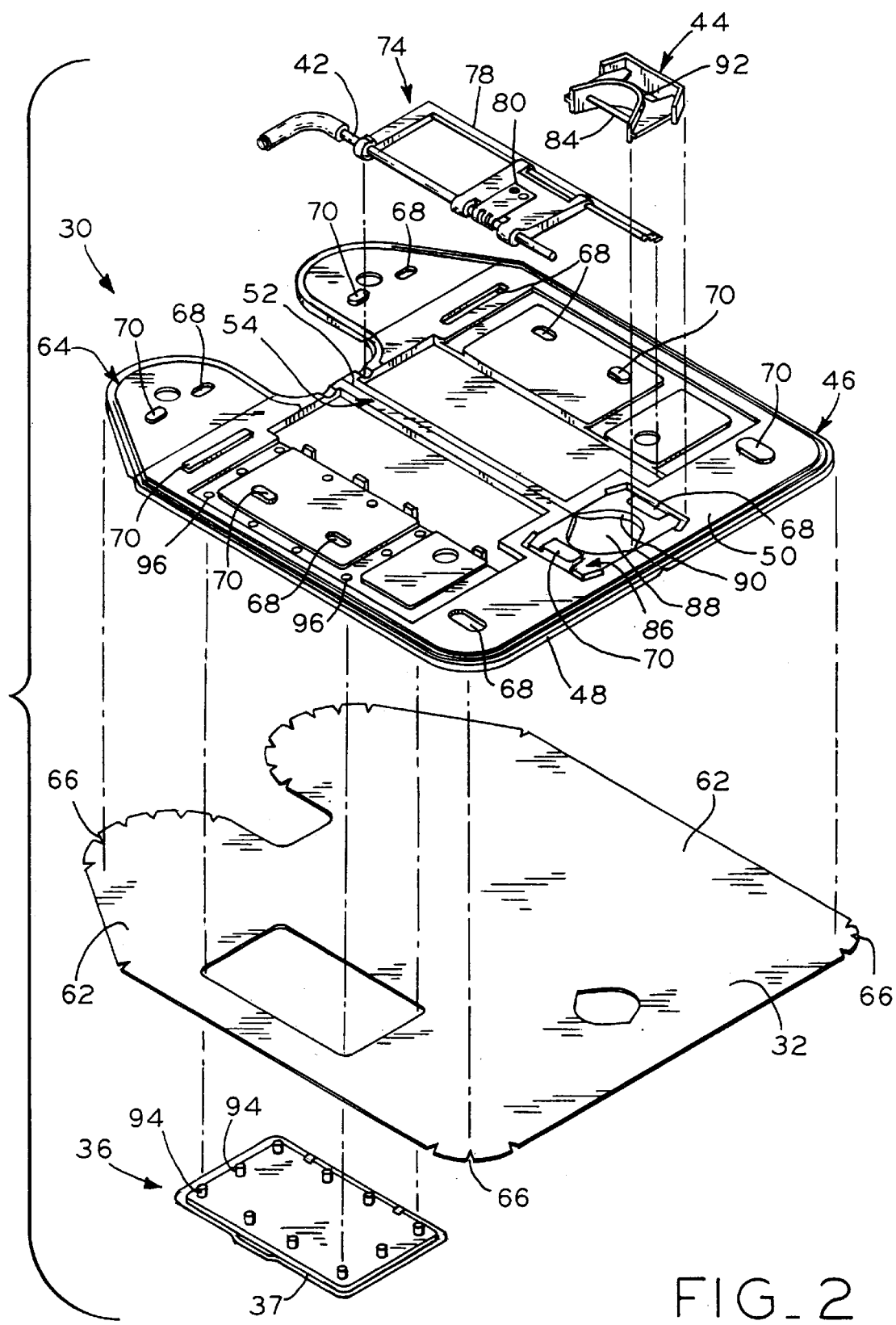
FIG_2

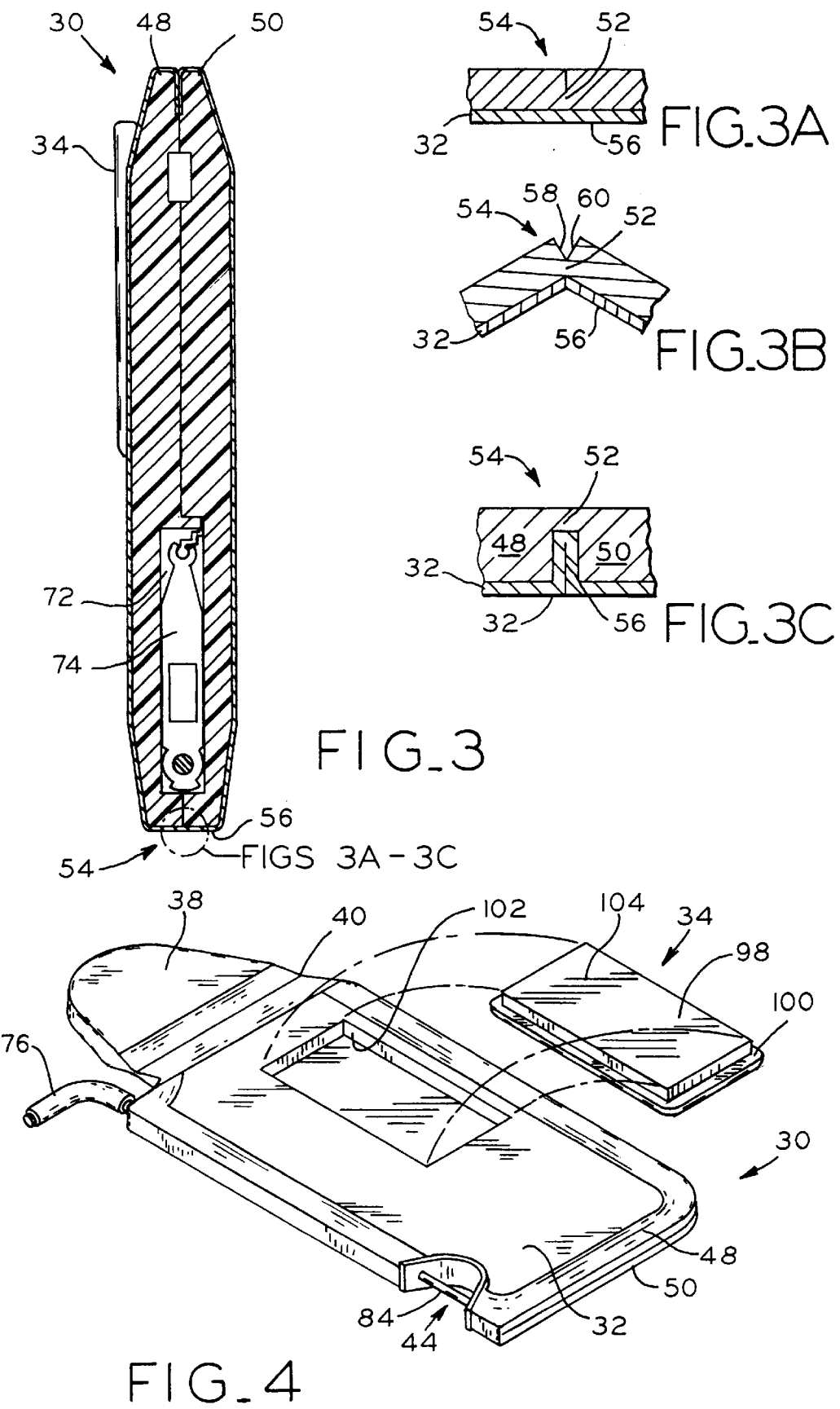

MOLDED POLYMER SUN VISOR WITH FUSED UPHOLSTERY COVER

BACKGROUND OF THE INVENTION

1. Field of the Invention

The present invention relates generally to sun visors for vehicles. More specifically, the present invention relates to the construction of a sun visor of the type having an outer shell comprised of two shell halves secured together and an upholstery cover covering the outer surfaces of the shell.

2. Description of the Related Art

It is well known to provide a sun visor for the windshield of a vehicle, wherein the sun visor is mounted on the vehicle body roof for movement between a storage position adjacent the vehicle head liner, a first use position adjacent the windshield, and a second use position adjacent a side door window opening. A conventional sun visor comprises a solid shell of pressed wood material and an outer cloth upholstery covering of a foam-backed cloth adhered to or otherwise connected to a kraft paper foundation. The covering is folded over the shell and is edge sewn along a seam circumjacent the periphery of the shell. More recently, there has been developed a sun visor having a molded plastic inner core. In U.S. Pat. No. 5,365,416, there is disclosed a sun visor having a plastic inner core and an outer shell assembly folded over the plastic core in the manner previously described. It is desired to improve the assembly of and the materials used in sun visors.

SUMMARY OF THE INVENTION

The present invention provides a sun visor having a molded polymer shell and an upholstery cover thermally fused to the outside surface thereof. The present invention provides a sun visor which is lighter, softer, and easier to manufacture than prior art sun visors.

The invention comprises, in one form thereof, a shell made of molded polymer. The shell further includes two shell halves joined together by a molded polymer band integrally formed with the shell. Thus, the shell halves are not separate members, but are instead joined together by the same polymer material from which each shell half is comprised. An upholstery cover covers the exterior surface of the shell and is thermally fused thereto. The upholstery cover is also fused to the exterior of the shell in the area of the band which joins the two halves together. The upholstery cover combines with the polymer band to form a hinge, and the two halves are folded together about the hinge to form the assembled sun visor.

In a preferred form of the above-described invention, the shell is comprised of expanded polypropylene (EPP) beads which are molded together to form an integral shell. During the molding process, the upholstery cover is thermally fused to the EPP beads. In a partially assembled stage of the molded polymer shell, the shell is unfolded so that core components can be installed therein before the shell halves are folded and secured together. The interior surfaces of the shell halves form correspondingly aligned projections and slots in each of the respective halves. After the interior core components are installed, the EPP shell can be heated so that the protrusions thermally fuse into the slots when the two shell halves are folded together, thereby securing the two halves together to form the assembled sun visor.

The invention comprises, in another form thereof, a shell comprised of molded polymer further including first and second shell halves sandwiched together. The first shell half includes an opening therethrough which is sized to receive a base which extends downwardly from a vanity mirror assembly. The mirror assembly also includes a flange around its periphery. The base extends through the opening in the first shell half and the bottom surface of the base is fused to the interior surface of the second shell half. The flange abuts against the exterior surface of the first shell half so that the mirror assembly secures the first and second shell halves together.

In a preferred form, the base of the vanity mirror assembly and the polymer shell are formed from the same polymer family, preferably polypropylene, thereby enhancing the bond therebetween created by thermal fusion.

One advantage of the present invention is that the EPP shell from which the sun visor is formed is significantly lighter than conventional materials used in the construction of sun visors. The specific gravity of the EPP is only 0.04 g/cc. Thus, the material used for the present invention facilitates the design goal of lighter automobile components.

Another advantage of the present invention is that the EPP material offers an improvement in impact energy absorbence. That is, the EPP material is softer than conventionally used materials so that the effects of impact therewith are less severe.

Yet another advantage of the EPP material used with the sun visor of the present invention is that it is environmentally friendly, in that it is 100 percent recyclable.

Still another advantage of the present invention is that it reduces the need for adhesives to bond the upholstery cover to the molded polypropylene shell. Indeed, the upholstery cover is either completely or mostly fused to the polymer shell without using adhesives.

Still a further advantage of the present invention is that the EPP shell is less expensive than conventionally used materials. Thus, the cost of the sun visor, and in turn, the cost of the entire vehicle is reduced by the present invention.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a plan view of an assembled sun visor in accordance with the present invention.

FIG. 2 is an exploded perspective view of an unfolded sun visor in accordance with the present invention.

FIG. 3 is a cross-sectional view of an assembled sun visor in accordance with the present invention.

FIG. 3a is an enlarged fragmentary view of the polymer and upholstery hinge of the present invention when the sun visor is assembled.

FIG. 3b is an enlarged fragmentary view of the polymer and upholstery hinge of the present invention with the sun visor partially unfolded.

FIG. 3c is an enlarged fragmentary view of the polymer and upholstery hinge of the present invention with the sun visor completely unfolded.

FIG. 4 is a partially exploded perspective view of a sun visor of a second embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DESCRIPTION OF THE PRESENT INVENTION

A sun visor assembly 30 is shown in FIGS. 1 and 2. Certain details of the sun visor assembly 30 are only partially shown and described or omitted entirely, in the interests of clarity.

Referring to FIG. 1, the illustrated visor assembly 30 includes an upholstery covering 32 which is formed of material such as vinyl, cloth, fabric, felt or other suitable upholstery material. Upholstery covering 32 may optionally include a foam backing (not shown). Sun visor assembly 30 also includes, optionally, a vanity mirror assembly 34 having cover 36 hingedly attached thereto. Flap 38 shown on the right side of visor 30 in FIG. 1 bends at crease 40 to conform to the interior shape of the top of the automobile to which the sun visor is attached. Visor 30 also includes support rod 42 which attaches to the interior of the vehicle (not shown). Pin section 44 includes pin 84 which attaches to clips extending from the vehicle interior (not shown).

The construction of sun visor 30 can be better appreciated with reference to FIG. 2, which shows an unfolded, partially assembled sun visor. Sun visor 30 is comprised of a molded polymer shell 46, which is further comprised of two shell halves 48, 50. A molded polymer band 52 joins halves 48 and 50 together. The shell is comprised of molded polymer, and preferably, expanded polypropylene (EPP) beads. When the unfolded shell shown in FIG. 2 is initially formed, the EPP beads and the upholstery cover 32 are placed into a mold. Thence, the mold is heated and the beads melt together and thermally fuse to cover 32.

In the illustrated embodiment, shell 46 is an integral piece of polymer. That is, band 52 is formed during the molding of shell 46 from the same polymer material as halves 48 and 50 and integrally joins the two halves together. The upholstery cover 32 covers and is fused to the exterior surface of the shell in the area of band 52 so that the upholstery cover combines with band 52 to form a hinge 54. Halves 48 and 50 are then folded together about hinge 54 to form the assembled sun visor. Hinge 54 provides a positive location for the edges of shell 46 when the visor is folded together. Hinge 54 also reduces the number of assembly parts for ease of manufacture.

The novel hinge of sun visor 30 of the present invention can be better seen in FIGS. 3 and FIGS. 3a–3c. FIG. 3 shows an assembled sun visor 30 having the two shell halves 48 and 50 folded together. Hinge 54 can be seen at the bottom of the sun visor in FIG. 3 and more clearly in enlarged FIG. 3a. The bottom surface 56 of the assembled sun visor is comprised of upholstery cover 32. A portion of polymer band 52 is shown in FIG. 3a as folded onto itself. The two halves into which polymer band 52 is folded can be seen in the partially unfolded sun visor of FIG. 3b, designated as 58 and 60. FIG. 3c shows a completely unfolded visor assembly like that shown in FIG. 2. In FIG. 3c, it can be seen that shell 46 is actually one piece and polymer band 52 connects shell halves 48 and 50. It can now be understood that cover 32 combines with band 52 to form hinge 54 about which the shell halves 48 and 50 are folded together.

Referring again to FIG. 2, it can be appreciated that the upholstery cover 32 is larger than shell 46. An outer edge 62 of cover 32 actually folds over the portion of the inside periphery 64 of shell 46. Wedges 66 are cut into the rounded and corner portions of cover 32 so that edge 62 can be folded over the corner portions of shell 46 without wrinkling thereof. An adhesive commonly known in the art can be applied to edge 62 so that it adheres to the inside periphery 64 of shell 46. Alternatively, edge 62 can be thermally fused to periphery 64, thereby obviating the need for adhesives.

The shell halves 48 and 50 are secured together by a plurality of corresponding slots 68 and protrusions 70 integrally formed in respective shell halves. That is, for each protrusion extending from shell half 50 there is a corresponding slot 68 disposed in shell half 48 and vice versa. Slots 68 and protrusions 70 can be of various sizes and shapes as shown in FIG. 2. In the assembled sun visor depicted in FIG. 3, protrusions 70 extend into and are fused to slots 68, thereby securing the two shell halves together. The fusion can be accomplished by heating the interior surface of shell 46 so that protrusions 70 thermally fuse into slot 68. It is to be understood that protrusions 70 can be adhered within slot 68 by means other than thermal fusion. For example, a glue or similar adhesive may be used instead of thermally fusion protrusions 70 into slots 68.

As shown in FIG. 3, shell halves 48 and 50 when folded together form cavity 72. Cavity 72 receives core components 74 as shown in FIG. 2. Core components 74 include support rod 42 which attaches to an interior of the automobile (not shown). Support rod 42 is secured to hinge block 80. Hinge block 80 is of the type described in U.S. Pat. No. 5,580,118 and application Ser. No. 08/703,819 filed on Aug. 27, 1996, which is a continuation-in-part thereof, both of which are owned by the assignee of the present invention and are incorporated herein by reference. Hinge block 80 slides along rail 78 and rod 42 slides therewith. Thus, rod 42 is extendable and retractable with respect to visor 30. The inside surface of cavity 72 is smooth so that hinge block 80 slides within cavity 72. Hinge block 80 is also pivotable about support rod 42 and the assembled sun visor is pivotable therewith.

Pin section assembly 44, which includes cylindrical pin 84, conveniently installs into shell 46 as shown in FIG. 2. Pin 84 is received into a clip (not shown) extending from the interior of the automobile. Shell halves 48 and 50 form a recess area 86 which receives pin section assembly 44. The center of the recess 86 forms a hole 88 which exposes pin 84 exteriorly of shell 46. Hole 88 has a ring-like outer surface 90 which matches the ring-like surface 92 of pin section assembly 44. Recess area 86 also includes a slot 70 and recess 68 which further secures pin section assembly into shell 46 and also secures shell halves 48 and 50 together.

Vanity mirror assembly 36 is mounted to the exterior of sun visor 30 by means of pegs 94 extending from the bottom of frame 37 of vanity mirror assembly 36. Each peg 94 extending from vanity mirror assembly 36 fits into a corresponding hole 96 formed in shell half 48. Holes 96 can be preformed in the initial molding process or, alternatively, holes 96 can be formed as vanity mirror assembly 36 is mounted onto shell 46. That is, mirror assembly 36 can be positioned on shell 48 and tapped into place, whereby pegs 94 "punch" through the molded polymer shell. It is further desirable that pegs 94 are thermally fused to shell half 48 and such can be accomplished by heating pegs 94 before mirror assembly 36 is installed on sun visor 30.

Another embodiment of the sun visor 30 of the present invention is shown in FIG. 4, wherein shell halves 48 and 50 are sandwiched together and shell half 48 includes an opening 102 therethrough. The frame of vanity mirror assembly 34 includes base 98 and flange 100. As shown in FIG. 4, base 98 of vanity mirror assembly 34 fits into opening 102 so that the bottom surface 104 of vanity mirror assembly 34 contacts the interior surface of shell half 50. Further, the bottom surface 104 of vanity mirror assembly 34 is thermally fused to the interior of shell half 50 by, for example, heating the vanity mirror base 98 before installing it into opening 102. The flange portion 100 is larger than opening 102 so that flange 100 abuts against the exterior surface of shell half 48 surrounding the opening 102, whereby the mirror assembly secures the first and second shell halves together. Preferably, the base 98 and shell 46 are comprised of the same material, such as polypropylene. More preferably, the shell is formed from expanded polypropylene (EPP) beads.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A sun visor for use in a vehicle, comprising:
   a shell comprised of expanded polypropylene beads, said shell further including two shell halves;
   said shell defining a molded polymer band joining said two halves together;
   an upholstery cover covering and fused to an exterior surface of said shell, said cover covering and fused to said band; and
   said upholstery cover and said band forming a hinge, whereby said two halves are folded about said hinge to form said sun visor.

2. The sun visor of claim 1, wherein said band is integrally formed with said shell, whereby said shell is a one-piece shell.

3. The sun visor of claim 2, wherein said upholstery cover covers a portion of an inside periphery of said shell.

4. The sun visor of claim 3, wherein an adhesive is disposed between said inside periphery and said upholstery cover.

5. The sun visor of claim 1, wherein one of said shell halves includes a protrusion extending therefrom and the other of said shell halves defines a slot, said protrusion extending into and fused into said slot, whereby the two shell halves are secured together.

6. The sun visor of claim 5, wherein said protrusion is integrally formed from said shell.

7. The sun visor of claim 1, further including:
   a cavity defined by said two shell halves; and
   a rod for attaching said sun visor to a vehicle interior member extending from said cavity, said sun visor being pivotable about the longitudinal axis of said rod.

8. The sun visor of claim 7 wherein said rod is extendable from said cavity.

9. A sun visor assembly, comprising:
   a shell comprised of a molded polymer, said shell further including first and second shell halves sandwiched together;
   said first shell half having an opening therethrough;
   a mirror assembly having a base and a flange, said base disposed in said opening, a bottom surface of said base fused to an interior surface of said second shell half, said flange abutting against an exterior surface of said first shell half surrounding the perimeter of said opening, whereby said mirror assembly secures said first and second shell halves together.

10. The sun visor of claim 9, further comprising an upholstery cover fused to at least a portion of an exterior surface of said shell.

11. The sun visor of claim 9, wherein said base and said shell are comprised of polypropylene.

12. The sun visor of claim 11, wherein said shell is formed from expanded polypropylene beads.

13. In combination:
   a sun visor, comprising:
      a shell formed of molded polymer;
      an upholstery cover fused to an exterior surface of said shell;
      said shell having at least one hole therein;
      a mirror assembly, comprising:
         a mirror frame;
         a mirror associated with said frame; and
         at least one peg extending from said frame, said peg extending into said hole in said shell and fused to said shell, whereby said mirror assembly is secured to said sun visor.

14. The combination of claim 13, wherein said peg comprises a plurality of pegs and said hole comprises a plurality of holes.

15. The combination of claim 13, wherein said frame and said shell are formed from the same family of polymer material.

16. The combination of claim 15, wherein said shell is comprised of expanded polypropylene.

17. The combination of claim 13, wherein said shell is further comprised of two shell halves.

18. The combination of claim 17, wherein one of said shell halve includes an integral protrusion, the other of said shell halves includes a slot in corresponding alignment with said protrusion, said protrusion fused into said slot, whereby said halves are secured together.

19. The combination of claim 17, wherein:
   said shell forms a molded polymer band joining said two halves together;
   an upholstery cover covers and is fused to an exterior surface of said shell, said cover covering and fused to said band; and
   said upholstery cover in combination with said band forming a hinge, said two halves are folded together about said hinge to form said sun visor.

* * * * *